Jan 6, 1931. S. ROSS ET AL 1,787,639
OVEN PLATE
Filed April 18, 1929 2 Sheets-Sheet 1

INVENTORS
SHERMAN ROSS.
ORAN H. McMAKEN.
BY
Toulmin + Toulmin
ATTORNEY

Jan 6, 1931.    S. ROSS ET AL    1,787,639
OVEN PLATE
Filed April 18, 1929    2 Sheets-Sheet 2

INVENTORS
SHERMAN ROSS.
ORAN H. McMAKEN.
BY
Toulmin & Toulmin
ATTORNEY

Patented Jan. 6, 1931

1,787,639

UNITED STATES PATENT OFFICE

SHERMAN ROSS AND ORAN H. McMAKEN, OF PIQUA, OHIO, ASSIGNORS TO THE FAVORITE STOVE AND RANGE COMPANY, OF PIQUA, OHIO, A CORPORATION OF OHIO

OVEN PLATE

Application filed April 13, 1929. Serial No. 356,204.

This invention relates to improvements in ovens, and more particularly to improvements in oven plates.

It is especially the object of this invention to provide in one of the walls of the oven a pair of holes adapted to receive therein forks attached to the oven plate in such a way as to permit the free upward-swinging movement of the plate to prevent the plate from being moved therefrom without the plate being bodily raised.

These and other advantages will appear from the following description, taken in connection with the drawings.

Referring to the drawings.

Figure 1:
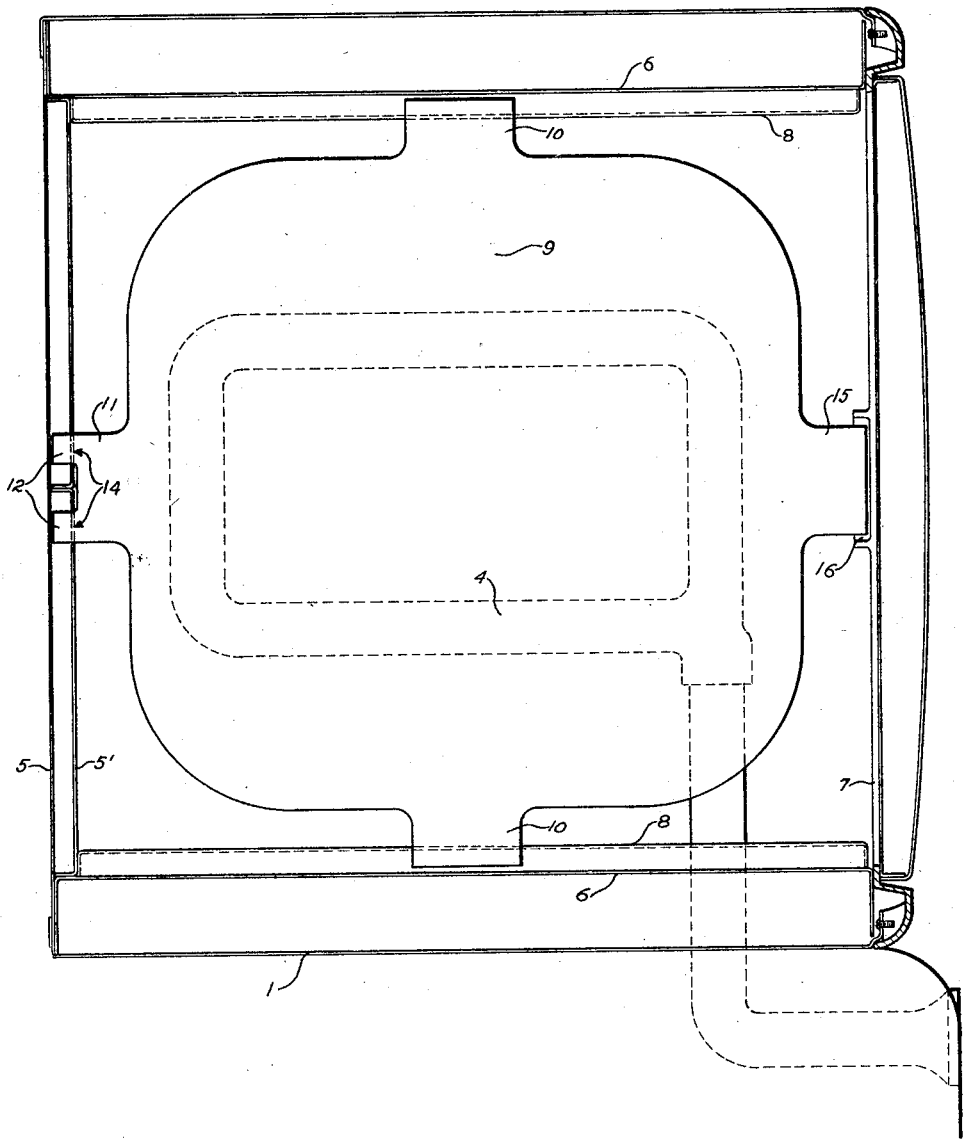
Figure 1 is a horizontal section of an oven showing in plan view the oven plate supported in the oven.
Figure 2:
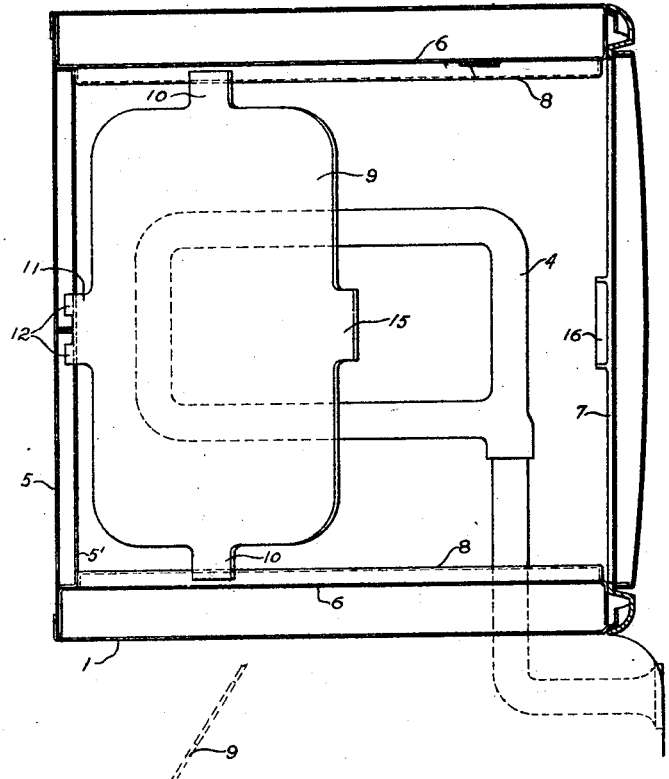
Figure 2 is a view similar to Figure 1 but showing the oven plate tilted and supported by the rear wall of the oven.
Figure 3:
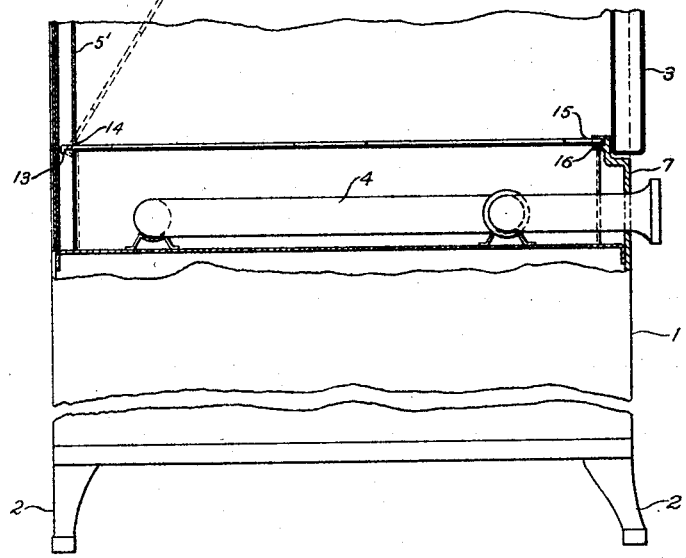
Figure 3 is a vertical section of the oven showing in dotted lines the oven plate in an upwardly tilted position, and the manner in which the plate is supported and held in the oven wall.

The numeral 1 is used to designate an oven as a whole, which is supported by the usual legs 2. There is provided for the oven the usual conventional door 3. The numeral 4 is used to designate a burner, preferably a gas burner, but any other suitable burner might be used.

The back part of the oven is indicated by the numeral 5, while the back lining thereof is indicated by the numeral 5'. The oven has the usual side walls 6, and a front wall 7 which supports the lower part of the door and against which the door engages when closed. On each side of the oven and attached to the lining there are the grid slides 8. These slides are for the purpose of supporting the sides of the oven plate, which is indicated by the numeral 9. The oven plate has extending from each side thereof a lip or projection 10 which engages the grid slides for the purpose of supporting the sides of the oven plate.

Extending from the rear of the oven plate is a back lip 11, which has formed on the end thereof two extensions or forks 12. The ends of these extensions are turned down to form hook members 13 to engage behind the lining of the back of the oven after the forks have been extended through the holes 14 in the back lining of the oven. There are two of these holes, each one to receive one prong of the fork for the purpose of holding the oven plate in position so that it will not easily slide after the forks have been placed in the holes 14. The hook members prevent the plate being slid forward but permit an easy swinging upward movement of the plate for the purpose of cleaning out the part of the oven beneath the oven plate, or for any other purpose.

On the front part of the oven plate there is a front lip 15, which is adapted to engage a front seat 16 on the front part of the oven 7. When the lip 15 is in engagement with the seat 16 and the lips 10 are in engagement with the slide grids 8 and the forks 12 are within the holes 14, the oven plate is held in horizontal position just above the burner.

Whenever it is desired to remove the oven plate it may be raised bodily so that the hooks can be released from the lining of the back of the oven, and after this is done the oven plate may be moved bodily through the front of the oven, but in the event that it is desired merely to tilt the front part of the oven plate upwardly the front part of the plate is taken hold of by the hand, or any other suitable means, and raised, the back wall lining serving as a pivot about which the oven plate turns, the hooks thereon preventing the oven plate from slipping and being easily removed therefrom except that the oven plate is bodily raised so that the hooks can be out of engagement with the lining of the oven.

By this means there is provided a means of attaching the oven plate to the oven in such a manner as to securely hold the plate in place, permitting a free movement thereof without the chance of it becoming displaced, it being only necessary to let the plate down after being raised so that the parts 10 and 15 will engage the parts 8 and 16 to hold the oven plate in its horizontal position. These forks in engagement with the holes 14 also prevent any turning or sidewise movement of the plate. In fact, as long as the forks 12 are in engagement with the holes 14 the oven plate will have no movement except an upward swinging movement.

We desire to comprehend within our invention such modifications as may be clearly embraced within our claims and the scope of our invention.

Having thus fully described our invention, what we claim is new and desire to secure by Letters Patent, is:

1. In combination with an oven having a plurality of supports thereon, one of said supports being formed by a hole in one wall of the oven, an oven plate, and a plurality of means on said plate to engage said supports, one of said means fitting in said hole so that the plate may swing therein but cannot be moved therefrom without being raised.

2. In combination with an oven having a plurality of supports thereon, one of said supports being formed by a pair of holes in one wall of the oven, an oven plate, and a plurality of projections on said plate to engage said supports, one of said projections being forked to fit in said holes.

3. In combination with an oven having a plurality of supports thereon, one of said supports being formed by a pair of holes in one wall of said oven, an oven plate, and a plurality of projections on said plate to engage said supports, one of said projections being forked and provided with hook means to fit through said holes and behind part of said wall.

4. In combination with an oven having a plurality of supports thereon, one of said supports being formed by a pair of holes in the rear lining of said oven, an oven plate, and a plurality of projections on said plate to engage said supports, one of said projections being forked and provided with downturned hook means to engage behind said lining and within said holes.

5. In combination with an oven having a rear lining therein, said lining having a pair of holes therein, an oven plate, and a pair of hooked projections on said plate fitting within said holes to partially support said plate and prevent slipping thereof.

6. In combination with an oven having a rear lining therein, said lining having a pair of holes therein, an oven plate, supporting means extending from said plate, a pair of hook-shaped projections on said supporting means and fitting within said holes and engaging behind said lining for partially supporting said plate.

7. In combination with an oven having a burner and a plurality of supports therein, one of said supports being formed by a rear lining with a pair of holes therein, an oven plate, and a plurality of projections on said plate to engage said supports, one of said projections having a pair of hooks thereon to fit through said holes and in engagement with said lining.

8. In an oven, a rectangular shaped oven plate having rounded corners, supporting projections on the sides of said plate, one of said projections being bent at its end to form a hook, and means on said oven for engagement by said hook whereby the plate is pivotally supported on one side.

In testimony whereof, we affix our signatures.

SHERMAN ROSS.
ORAN H. McMAKEN.